United States Patent
Lingamneni et al.

(10) Patent No.: US 10,725,840 B2
(45) Date of Patent: Jul. 28, 2020

(54) AUTOMATED WEB SERVICE AND API BUILD CONFIGURATION FRAMEWORK

(71) Applicant: American Express Travel Related Services Company, Inc., New York, NY (US)

(72) Inventors: Krishna K. Lingamneni, Phoenix, AZ (US); Nagarajan Deivasigamani, Phoenix, AZ (US)

(73) Assignee: AMERICAN EXPRESS TRAVEL RELATED SERVICES COMPANY, INC., New York, NY (US)

( * ) Notice: Subject to any disclaimer, the term of this patent is extended or adjusted under 35 U.S.C. 154(b) by 0 days.

(21) Appl. No.: 16/188,668

(22) Filed: Nov. 13, 2018

(65) Prior Publication Data

US 2020/0151038 A1 May 14, 2020

(51) Int. Cl.
*G06F 9/54* (2006.01)
*G06F 8/71* (2018.01)

(52) U.S. Cl.
CPC .............. *G06F 9/547* (2013.01); *G06F 8/71* (2013.01)

(58) Field of Classification Search
CPC ... G06F 8/30; G06F 8/71; G06F 9/541; G06F 17/30575
USPC .......... 719/328; 717/106, 120, 122; 707/610
See application file for complete search history.

(56) References Cited

U.S. PATENT DOCUMENTS

| | | | |
|---|---|---|---|
| 4,695,963 A | 9/1987 | Sagisawa et al. | |
| 6,180,867 B1 | 1/2001 | Hedengren et al. | |
| 7,284,233 B2 * | 10/2007 | Sengodan | G06F 17/218 715/784 |
| 7,620,885 B2 * | 11/2009 | Moulckers | G06F 8/34 715/201 |
| 7,685,314 B2 * | 3/2010 | Hsiao | G06F 9/541 709/246 |
| 7,797,678 B2 * | 9/2010 | Moulckers | G06F 8/34 705/54 |
| 7,958,487 B2 * | 6/2011 | Chandrasekharan | G06F 8/20 717/106 |
| 8,375,351 B2 * | 2/2013 | Ahadian | G06F 8/24 717/101 |
| 8,510,707 B1 * | 8/2013 | Heuler | G06F 8/36 717/106 |
| 8,799,251 B2 * | 8/2014 | McCormack | G06F 16/258 707/705 |
| 9,201,468 B2 | 12/2015 | Schediwy | |
| 9,836,446 B2 * | 12/2017 | Brisebois | G06F 17/243 |

(Continued)

*Primary Examiner* — Andy Ho

(74) *Attorney, Agent, or Firm* — Thomas Horstemeyer, LLP

(57) ABSTRACT

Systems and methods for the automated building and configuration of integration services are disclosed. The system may store and maintain various integration pattern templates comprising preprogrammed integration services (e.g., web services, APIs, etc.) needing defined operation details to be functional. The system may receive a specification file and a service specific parameter, parse the specification file and the service specific parameter to determine an operation detail, and extract the operation detail from the specification file and the service specific parameter. The system may input the operation detail into the integration pattern template to generate a service configuration file. The service configuration file may be deployed in a service integration platform.

20 Claims, 3 Drawing Sheets

(56) References Cited

U.S. PATENT DOCUMENTS

| | | | |
|---|---|---|---|
| 2001/0047279 A1* | 11/2001 | Gargone | G06Q 10/067 |
| | | | 705/342 |
| 2009/0119334 A1* | 5/2009 | Ahern | G06Q 10/06 |
| 2010/0107770 A1 | 5/2010 | Serban et al. | |
| 2014/0047319 A1* | 2/2014 | Eberlein | G06F 17/2247 |
| | | | 715/234 |
| 2018/0018078 A1* | 1/2018 | Hundemer | H04L 67/02 |

* cited by examiner

AUTOMATED WEB SERVICE AND API BUILD CONFIGURATION FRAMEWORK

FIELD

The disclosure generally relates to web services and APIs, and more specifically, to systems and methods for an automated web service and an API build configuration framework.

BACKGROUND

Service integration layers, platforms, and architectures may be used to enable data consumers to consume data from one or more data environments. Data consumers may submit requests to consume data in different formats and protocols, and data environments may store and retrieve data using different formats and protocols. The service integration layer, platform, architecture, or the like may implement, for example, various web services and/or application programming interfaces (APIs) configured to provide services such as routing, transformation of requests to, management, security, and other control and governance functions.

Programmers may access a graphical user interface (GUI) integrated into the service integration layer, platform or architecture to develop or update web services or APIs. However, the development of new or updated web services or APIs may require extensive manual coding and may be time consuming to meet coding standards, naming conventions, and service-oriented architecture (SOA) or representational state transfer (REST) best practices. A technical problem is that access to the GUI over a network may be slow, and simultaneous use of the GUI by multiple programmers may further slow processing times in the service integration layer, platform or architecture, often leading to intermittent and abrupt logouts and loss of unsaved code.

SUMMARY

Systems, methods, and articles of manufacture (collectively, the "system") for the automated generation of integration services are disclosed. The system may retrieve an integration pattern template, wherein the integration pattern template comprises a preprogrammed integration service. The system may parse a specification file and a service specific parameter to determine an operation detail. The system may extract the operation detail from the specification file and the service specific parameter. The system may generate a service configuration file by inputting the operation detail into the integration pattern template.

In various embodiments, the system may also transmit the service configuration file to a service integration platform, wherein in response to receiving the service configuration file the service integration platform deploys the service configuration file. In various embodiments, the operation detail comprises a first XML tag. The parsing the specification file may comprise identifying the operation detail based on the first XML tag. The integration pattern template may comprise an input field having a second XML tag. The operation may be input into the integration pattern template by matching the first XML tag of the operation detail with the second XML tag of the input field from the integration pattern template. In various embodiments, the system may also validate the specification file by comparing the specification file against a pre-configured rule.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

In various embodiments, a system for the automated building and configuration of service configuration files is disclosed. The system provides a technical solution to the technical problem caused by the typical manual programming processes by automating the building, configuration, and enhancement of web services, APIs, and the like. The system may automate the building, configuration, and enhancement of web services, APIs, and the like, by generating a service configuration file based on a reusable set of integration pattern templates. Each integration pattern template may comprise a coding template corresponding to one or more integration services such as, for example, a HTTPS/SOAP front end request connecting to a MQ/CICS mainframe back end, a HTTPS/SOAP front end request connecting to a DB2 database, a HTTPS/SOAP front end request connecting to a DB2 database with failover to a MQ/CICS mainframe back end, and/or the like. The generated service configuration file may be uploaded into a service integration platform to be used by various data consumers. The system may therefore decrease development and review effort compared to typical manual coding processes, thus saving development and coding time, decreasing cost of development and time to market, and improving developer and programmer productivity.

This system further improves the functioning of the computer. For example, by the user selecting various integration patterns as opposed to manually coding configuration files, the user performs less computer functions and provides less input, which saves on data storage and memory which speeds processing. In various embodiments, the system automates the creation of web services, APIs, and the like, enabling programmers and developers to spend at least 70%-80% less time in coding and developing the web services, APIs, and the like, thus decreasing CPU utilization and resource consumption in development environments. Further, by automating the coding and testing of web services, APIs, and the like, the system may reduce computer resource requirements typically required in testing and developer environments. The system may also reduce the cost of developing of web services, APIs, and the like, and may reduce the time to develop and test web services, APIs, and the like, compared to typical development, coding, and testing processes. In various embodiments, use of integration pattern templates in generating web services, APIs, and the like may also improve the quality of developed web services, APIs, and the like by ensuring that the developed web services, APIs, and the like contain correct configuration values and setting (e.g., as set forth in each integration pattern template).

Figure 1:
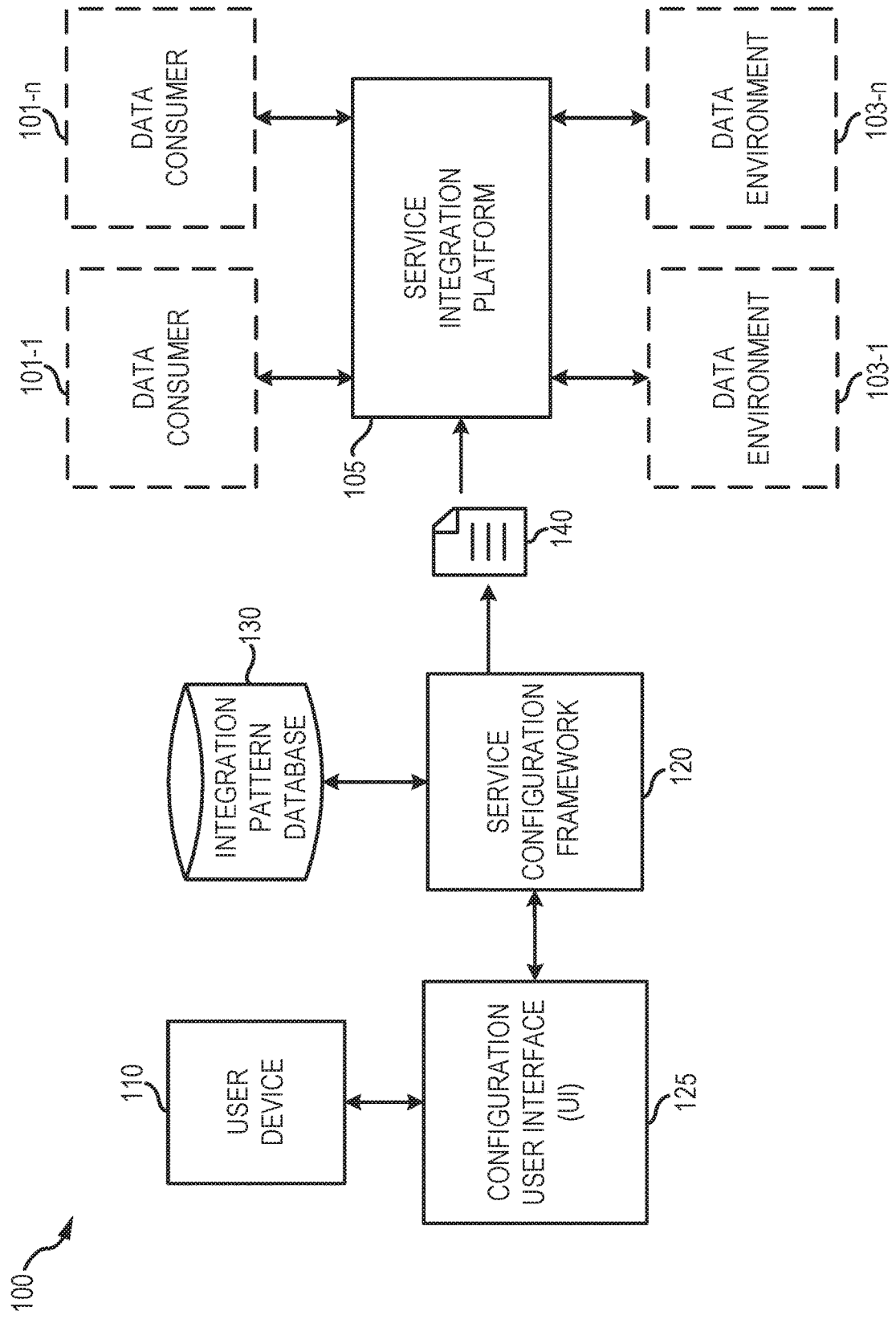
FIG. 1 is a block diagram illustrating various system components of a system for automated building and configuration of service configuration files, in accordance with various embodiments.

In various embodiments, and with reference to FIG. 1, a system 100 for automated building and configuration of service configuration files is disclosed. System 100 may comprise one or more of a user device 110, a service configuration framework 120, a service integration platform 105, a data consumer 101, and/or a data environment 103. System 100 may also contemplate uses in association with web services, utility computing, pervasive and individualized computing, security and identity solutions, autonomic computing, cloud computing, commodity computing, mobility and wireless solutions, open source, biometrics, grid computing, and/or mesh computing.

In various embodiments, one or more data consumers 101 (e.g., a first data consumer 101-1, an "Nth" data consumer 101-n, etc.) may desire to consume data from one or more data environments 103 (e.g., a first data environment 103-1, an "Nth" data environment 103-n, etc.). Each data consumer 101 may comprise any suitable consumer of data from data environment 103. For example, and in accordance with various embodiments, data consumers 101 may comprise an entity; a business unit within the entity; a system, platform, server, or the like; a software application, mobile application, or the like; and/or any other suitable consumer of data. As a further example, data consumer 101 may comprise a consumer of data related to financial and/or transactional systems and processes, such as a merchant, an issuer system, a transaction account holder, or the like. Each data consumer 101 may comprise any suitable combination of hardware and software components, including one or more processors, servers, networking interfaces, or the like.

Each data environment 103 may comprise any suitable source of data. For example, and in accordance with various embodiments, data environment 103 may comprise sources of data related to financial and/or transactional systems and processes, such as, a merchant submission system, a settlement database, an accounts receivable database, an account payable database, a subscriber or transaction account holder database, and/or the like. Each data environment 103 may comprise any suitable combination of hardware, software, and database components, including one or more databases, processors, servers, pooled servers, mainframe computers, networking interfaces, and the like.

Each data consumer 101 and data environment 103 may exchange data according to one or more protocols, including, for example, MQ, HTTP, HTTPS, REST, SQL, or the like. In that regard, one or more data consumers 101 may request to consume data using a protocol that is different from, or not compatible with, protocols used by one or more data environments 103. In that regard, each data consumer 101 and data environment 103 may be in electronic communication with service integration platform 105. Service integration platform 105 may be configured to provide protocol bridging services between the data consumers 101 and the data environments 103. In that regard, service integration platform 105 may provide various web services, APIs, or the like (the "integration services") configured to enable data consumers 101 to consume data from one or more data environments 103. For example, a data consumer 101 may be configured to transmit data consumption request compatible with an MQ protocol, HTTP, HTTPS, or the like. The specified data environment 103 may be configured to receive data consumption requests compatible with an MQ protocol, HTTP, HTTPS, SQL, or the like. The requests may be formatted using XML, JSON, or the like. The integration services may be configured to translate the front end request into a back end format that can be executed to retrieve or interact with data from the specified data environment 103. Service integration platform 105 may also be configured to provide data validation, data transformation, routing capabilities, security capabilities, management capabilities, control and governance functionalities, and the like.

Service integration platform 105 may comprise any suitable combination of hardware, software, and/or database components. For example, service integration platform 105 may comprise middleware configured to bridge communications between data consumers 101 and data environments 103. As a further example, service integration platform 105 may comprise one or more network environments, servers, computer-based systems, processors, databases, and/or the like. Service integration platform 105 may comprise at least one computing device in the form of a computer or processor, or a set of computers/processors, although other types of computing units or systems may be used, such as, for example, a server, web server, pooled servers, or the like. Service integration platform 105 may also include one or more data centers, cloud storages, or the like, and may include software, such as services, APIs, and the like, configured to perform various operations discussed herein. In various embodiments, service integration platform 105 may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein. In various embodiments, service integration platform 105 may comprise IBM WEBSPHERE DATAPOWER® appliances that may comprise pre-configured rack mountable network devices that help accelerate XML and web services deployments while extending SOA infrastructure. In various embodiments, service integration platform 105 may comprise an API management platform configured to design, secure, deploy, monitor, and/or scale APIs, such as, for example, GOOGLE® Apigee.

In various embodiments, service configuration framework 120 may be configured to generate a service configuration file 140 deployable on service integration platform 105. Service configuration framework 120 may be configured to generate service configuration file 140 based on various user input and one or more integration pattern templates, as discussed further herein. Service configuration file 140 may comprise an executable file having XML, JSON, or the like formatting. Service configuration file 140 may be deployed in service integration platform 105 as a web service, API, or the like to aid in protocol bridging between data consumers 101 and data environments 103, as discussed further herein. Service configuration framework 120 may comprise one or more network environments, servers, computer-based systems, processors, databases, and/or the like. Service configuration framework 120 may comprise at least one computing device in the form of a computer or processor, or a set of computers/processors, although other types of computing units or systems may be used, such as, for example, a server, web server, pooled servers, or the like. Service configuration framework 120 may also include one or more data centers, cloud storages, or the like, and may include software, such as services, APIs, and the like, configured to perform various operations discussed herein. In various embodiments, service configuration framework 120 may include one or more processors and/or one or more tangible, non-transitory memories and implement logic. The processor may be configured to implement various logical operations in response to execution of instructions, for example, instructions stored on a non-transitory, tangible, computer-readable medium, as discussed further herein.

Service configuration framework 120 may include, or be in electronic communication with, an integration pattern database 130. Integration pattern database 130 may comprise any suitable database, data structure, file system, or the like, capable of storing and maintaining data. Integration pattern database 130 may be configured to store and maintain one or more integration pattern templates. Each integration pattern template may comprise a structure that needs to be updated with service-specific parameters provided by user input, as discussed further herein. For example, each integration pattern template may comprise a reusable schema defining an integration service, such as, for example a HTTP to MQ/CICS web service, a HTTP to SQL/DB2 web service, a HTTP to SQL/DB2 with MQ/CICS as failover web service, a HTTPS to MQ/CICS web service, a HTTPS to SQL/DB2 web service, a HTTPS to SQL/DB2 with MQ/CICS as failover web service, a HTTP to MQ/CICS RESTful API, a HTTP to SQL/DB2 RESTful API, a HTTP to SQL/DB2 with MQ/CICS as failover RESTful API, a HTTPS to MQ/CICS RESTful API, a HTTPS to SQL/DB2 RESTful API, a HTTPS to SQL/DB2 with MQ/CICS as failover RESTful API, and/or any other desired integration service.

The integration pattern template may comprise a preprogrammed integration service needing user input to be completed. For example, the integration pattern template may comprise one or more input fields (e.g., structure, class, objects, etc.). The integration pattern template may comprise a XML format and each input field may correspond to a XML tag. For example, the input fields may comprise HTTPUserAgent, XMLManager, HTTPSourceProtocolHandler, StylePolicyActions, CryptoCertificate, CryptoValCred, AAAPolicy, WSStylePolicyRule, WSStylePolicy, WSGateway, and/or any other desired input field. Each input field may comprise one or more sub-input field, and may be associated with one or more other input fields, classes, objects, or the like. Each integration pattern template may comprise metadata comprising files, classes, associations, and the like. For example, WSGateway may comprise a one-to-one association with a WSStylePolicyRule class defining a Request/Response and Error Rule within the integration service. In that regard, an integration service may be generated by inputting user propagated data into each of the input fields to complete the integration pattern template, as discussed further herein.

In various embodiments, one or more integration pattern templates may be based on preexisting services, API's, or the like. For example, during the creation of a service, API, or the like, an export file may be generated. The export file may be parsed and separated into separate integration pattern templates. Each integration pattern template identified from the export file may be modified to remove the input fields previously discussed.

Figure 2:
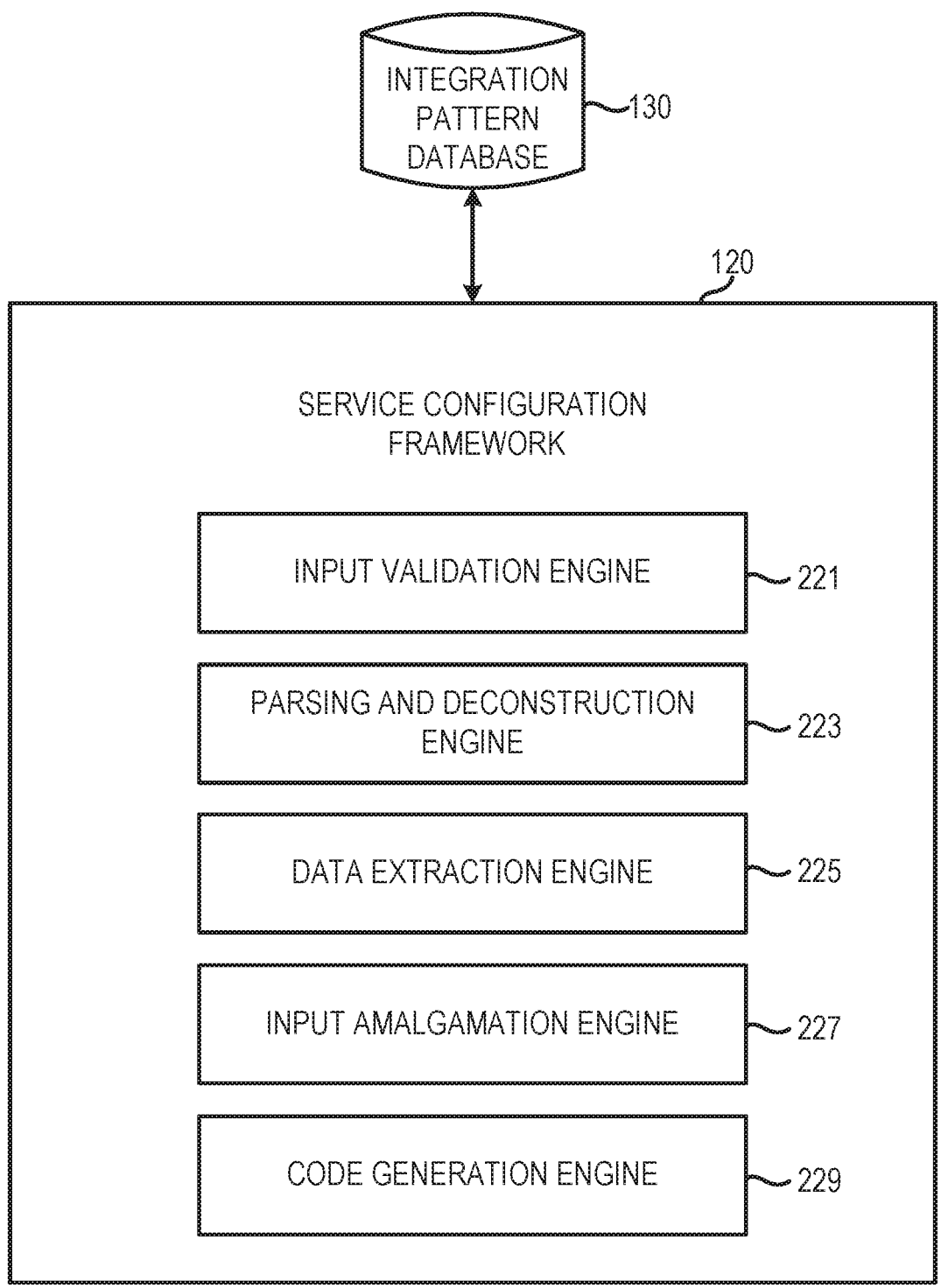
FIG. 2 is a block diagram illustrating various components of an exemplary service configuration framework for a system for automated building and configuration of service configuration files, in accordance with various embodiments.

In various embodiments, service configuration framework 120 may comprise various components configured to aid service configuration framework 120 with generating service configuration files 140. For example, and with reference to FIG. 2, service configuration framework 120 may comprise one or more of an input validation engine 221, a parsing and deconstruction engine 223, a data extraction engine 225, an input amalgamation engine 227, and/or a code generation engine 229. Each service configuration framework 120 component may comprise one or more software and/or hardware components, and may be configured to perform one or more operations, as discussed further herein.

In various embodiments, input validation engine 221 may be configured to receive various inputs from user device 110, via configuration UI 125, and validate the inputs. For example, input validation engine 221 may receive a specification file and one or more service specific parameters using one or more VB.net components, or the like. Input validation engine 221 may validate the inputs using pre-configured rules. The pre-configured rules may comprise naming conventions, programming best practices, or the like. For example, and in accordance with various embodiments, input validation engine 221 may validate that a port number input by confirming that the port number input is within a port number range permitted by the integration pattern template, may validate that a service name input, operation name input, or the like follow naming standards, may validate that the operation details from the specification files are accurate, and/or the like. In response to the validation failing, input validation engine 221 may transmit a validation error to user device 110, via configuration UI 125. The validation error may comprise data indicating what in the specification file and/or service specific parameter input caused the validation to fail.

In various embodiments, parsing and deconstruction engine 223 may be configured to parse and deconstruct the inputs received from user device 110, such as, for example, the specification file and the service specific parameters. Parsing and deconstruction engine 223 may implement various XML classes available in the .NET framework to aid in parsing and deconstructing the inputs. Parsing and deconstruction engine 223 may parse and deconstruct the specification file and the service specific parameters to determine one or more operations details specified therein. For example, parsing and deconstruction engine 223 may parse the specification file and the service specific parameters by identifying one or more XML tags and the corresponding and associated text.

In various embodiments, data extraction engine 225 may be configured to extract data from the user inputs. Data extraction engine 255 may extract data by implementing language integrated query (LINQ) capabilities, such as those offered by VB.NET. For example, data extraction engine 225 may extract the XML tag and corresponding text (e.g., the operation details) for each XML tag located by parsing and deconstruction engine 223.

In various embodiments, input amalgamation engine 227 may be configured to input the extracted data into an integration pattern template. Input amalgamation engine 227 may parse the integration pattern template to determine an XML tag associated with one or more input fields. Input amalgamation engine 227 may determine the operation detail having an XML tag matching the XML tag of the input field. In response to locating a match, input amalgamation engine 227 may edit the input field of the integration pattern template to comprise the operation detail. Input amalgamation engine 227 may continue inputting the operation details into the integration pattern template until all input fields of the integration pattern template are filled.

In various embodiments, code generation engine 229 may be configured to finalize coding and generate the service configuration file 140. For example, code generation engine 229 may receive from input amalgamation engine 227 the integration pattern template including the inputted operation details. For example, code generation engine 229 may generate the service configuration file 140 to comprise integration service specific code capable of being deployed in service integration platform 105. The service configuration file 140 may comprise a XML format. In various embodiments, the generated service configuration file 140 may be imported into the service integration platform 105 to complete the creation of the service, API, or the like.

In various embodiments, and with reference again to FIG. 1, user device 110 may be in electronic communication with service configuration framework 120 via a configuration user interface (UI) 125. For example, user device 110, via configuration UI 125, may interact with service configuration framework 120 to generate one or more service configuration files 140, as discussed further herein. User device 110 may comprise any suitable hardware, software, and/or database components capable of transmitting, receiving, and storing data. For example, user device 110 may comprise a personal computer, personal digital assistant, cellular phone, smartphone (e.g., IPHONE®, BLACKBERRY®, etc.), IoT device, kiosk, and/or the like. User device 110 may comprise an operating system, such as, for example, a WINDOWS® mobile operating system, an ANDROID® operating system, APPLE® IOS®, a BLACKBERRY® operating system, a LINUX® operating system, and the like. User device 110 may also comprise software components installed on user device 110 and configured to allow user device 110 access to various system 100 components. For example, user device 110 may comprise a web browser (e.g., MICROSOFT INTERNET EXPLORER®, GOOGLE CHROME®, etc.), an application, a micro-app or mobile application, or the like, configured to allow user device 110 to access and interact with various system 100 components. In various embodiments, user device 110 may be computer based, and may comprise a processor, a tangible non-transitory computer-readable memory, and/or a network interface, along with other suitable system software and hardware components. Instructions stored on the tangible non-transitory memory may allow user device 110 to perform various functions, as described herein.

Configuration UI 125 may comprise software, a mobile application, a web interface, or the like accessible from user device 110. For example, configuration UI 125 may include a graphical user interface ("GUI"), software modules, logic engines, various databases, interfaces to systems and tools, and/or computer networks. For example, configuration UI 125 may provide a GUI configured to enable user device 110 to interact with various components in service configuration framework 120 and transmit and receive data from service configuration framework 120, as discussed further herein.

As used herein, "transmit" may include sending at least a portion of electronic data from one system 100 component to another. Additionally, as used herein, "data," "information," or the like may include encompassing information such as commands, queries, files, messages, data for storage, and the like in digital or any other form.

As used herein, "electronic communication" may comprise a physical coupling and/or non-physical coupling capable of enabling system 100 components to transmit and receive data. For example, "electronic communication" may refer to a wired or wireless protocol such as a CAN bus protocol, an Ethernet physical layer protocol (e.g., those using 10BASE-T, 100BASE-T, 1000BASE-T, etc.), an IEEE 1394 interface (e.g., FireWire), Integrated Services for Digital Network (ISDN), a digital subscriber line (DSL), an 802.11a/b/g/n/ac signal (e.g., Wi-Fi), a wireless communications protocol using short wavelength UHF radio waves and defined at least in part by IEEE 802.15.1 (e.g., the BLUETOOTH® protocol maintained by Bluetooth Special Interest Group), a wireless communications protocol defined at least in part by IEEE 802.15.4 (e.g., the ZIGBEE® protocol maintained by the ZigBee alliance), a cellular protocol, an infrared protocol, an optical protocol, or any other protocol capable of transmitting information via a wired or wireless connection.

One or more of the system 100 components may be in electronic communication via a network. As used herein, the term "network" may further include any cloud, cloud computing system, or electronic communications system or method that incorporates hardware and/or software components. Communication amongst the nodes may be accomplished through any suitable communication channels, such as, for example, a telephone network, an extranet, an intranet, Internet, point of interaction device (personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using Internetwork Packet Exchange (IPX), APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the Internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing.

The various system components may be independently, separately or collectively suitably coupled to the network via data links which includes, for example, a connection to an Internet Service Provider (ISP) over the local loop as is typically used in connection with standard modem communication, cable modem, DISH NETWORKS®, ISDN, DSL, or various wireless communication methods. It is noted that the network may be implemented as other types of networks, such as an interactive television (ITV) network. Moreover, the system contemplates the use, sale or distribution of any goods, services or information over any network having similar functionality described herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), HPE Format-Preserving Encryption (FPE), Voltage, Triple DES, Blowfish, AES, MD5, HMAC, IDEA, RC6, and symmetric and asymmetric cryptosystems. Network communications may also incorporate SHA series cryptographic methods, elliptic-curve cryptography (e.g., ECC, ECDH, ECDSA, etc.), and/or other post-quantum cryptography algorithms under development.

For the sake of brevity, conventional data networking, application development, and other functional aspects of system 100 may not be described in detail herein. Furthermore, the connecting lines shown in the various figures contained herein are intended to represent exemplary functional relationships and/or electronic communications between the various elements. It should be noted that many alternative or additional functional relationships or electronic communications may be present in a practical system.

Figure 3:
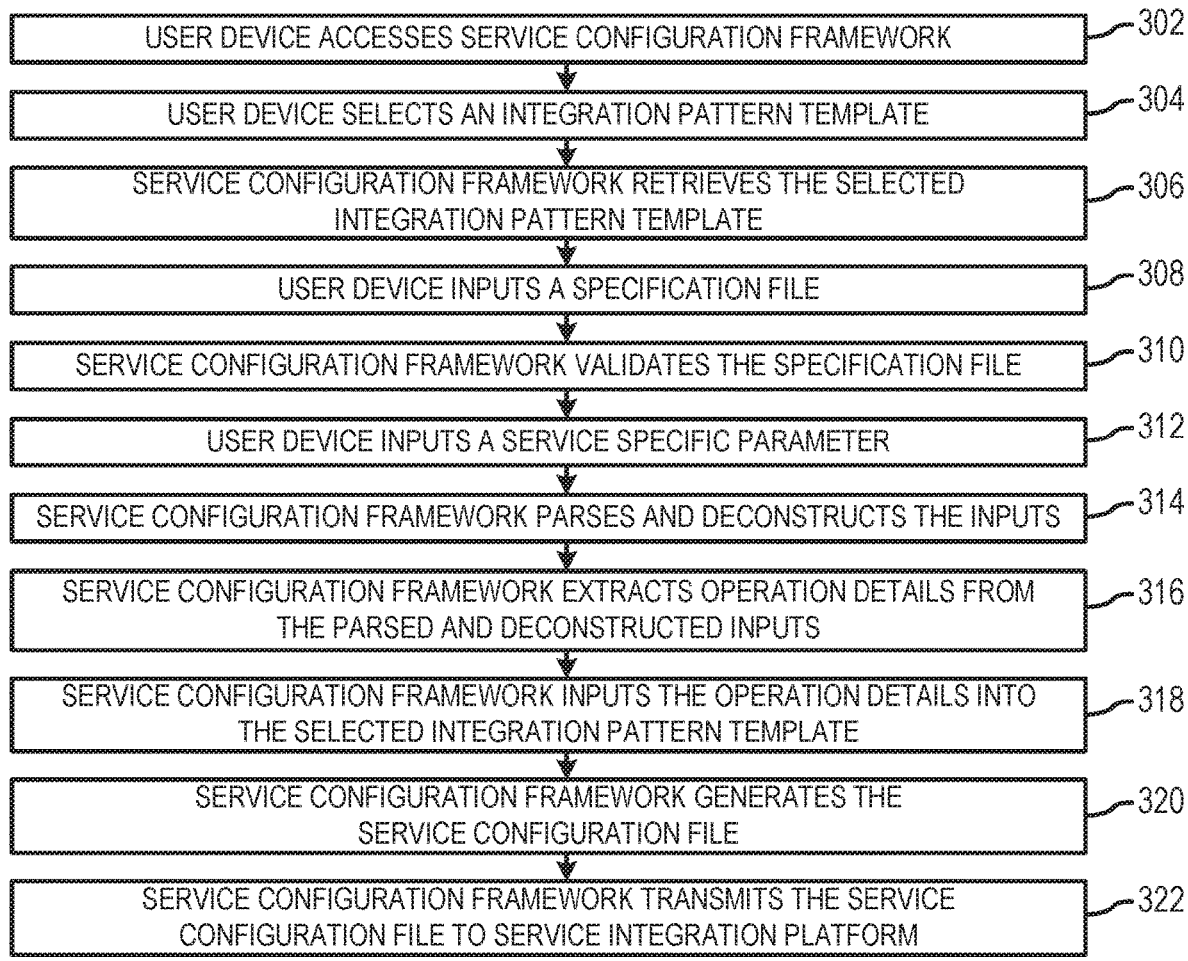
FIG. 3 illustrates a process flow for a method of generating a service configuration file, in accordance with various embodiments.

Referring now to FIG. 3 the process flows and screenshots depicted are merely embodiments and are not intended to limit the scope of the disclosure. For example, the steps recited in any of the method or process descriptions may be executed in any order and are not limited to the order presented. It will be appreciated that the following description makes appropriate references not only to the steps and user interface elements depicted in FIG. 3, but also to the various system components as described above with reference to FIGS. 1 and 2. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below. Unless otherwise specifically noted, articles depicted in the drawings are not necessarily drawn to scale.

With specific reference to FIG. 3, a method 301 for generating a service configuration file is disclosed. User device 110 accesses service configuration framework 120 (step 302), via configuration UI 125. For example, user device 110 may access service configuration framework 120 by inputting access credentials (e.g., username, password, biometric input, etc.) or by selecting to generate a service configuration file, update a preexisting service configuration file, or the like. Service configuration framework 120, via configuration UI 125, may display various options to user device 110, including one or more integration pattern templates, service specific parameter options, specification file uploads, preexisting service configuration file uploads, and the like.

User device 110 selects an integration pattern template (step 304). For example, configuration UI 125 may display a list of available integration pattern templates identifiers (e.g., name, description, etc.), and user device 110 may select the desired integration pattern template from the list. Service configuration framework 120 retrieves the selected integration pattern template (step 306) from integration pattern database 130. Each integration pattern template may comprise a reusable schema defining an integration service, such as, for example a HTTP to MQ/CICS web service, a HTTP to SQL/DB2 web service, a HTTP to SQL/DB2 with MQ/CICS as failover web service, a HTTPS to MQ/CICS web service, a HTTPS to SQL/DB2 web service, a HTTPS to SQL/DB2 with MQ/CICS as failover web service, a HTTP to MQ/CICS RESTful API, a HTTP to SQL/DB2 RESTful API, a HTTP to SQL/DB2 with MQ/CICS as failover RESTful API, a HTTPS to MQ/CICS RESTful API, a HTTPS to SQL/DB2 RESTful API, a HTTPS to SQL/DB2 with MQ/CICS as failover RESTful API, and/or any other desired integration service.

The integration pattern template may comprise a preprogrammed integration service needing user input to be completed. For example, the integration pattern template may comprise one or more input fields (e.g., structure, class, objects, etc.). The integration pattern template may comprise a XML format and each input field may correspond to a XML tag. For example, the input fields may comprise HTTPUserAgent, XMLManager, HTTPSourceProtocolHandler, StylePolicyActions, CryptoCertificate, CryptoValCred, AAAPolicy, WSStylePolicyRule, WSStylePolicy, WSGateway, and/or any other desired input field. Each input field may comprise one or more sub-input field, and may be associated with one or more other input fields, classes, objects, or the like. For example, WSGateway may comprise a one-to-one association with a WSStylePolicyRule class defining a Request/Response and Error Rule within the integration service. In that regard, an integration service may be generated by inputting user propagated data into each of the input fields to complete the integration pattern template, as discussed further herein User device 110 inputs a specification file (step 308). The specification file may comprise any suitable file, document, or the like including one or more operation details corresponding to the integration service. For example, the specification file may comprise a web services description language (WSDL) file, a SWAGGER™ file, or the like. The specification file may describe and document the integration service to be generated, and may include the operation details needed to complete the integration pattern template. The specification file may comprise a XML format and each operation detail may comprise a XML tag.

In various embodiments, in response to receiving the specification file, service configuration framework 120, via input validation engine 221, validates the specification file (step 310). For example, input validation engine 221 may comprise one or more pre-configured rules. The pre-configured rules may validate the specification file based on defined naming conventions, programming best practices, or the like. In response to the specification file failing validation, service configuration framework 120, via configuration UI 125, may return a validation error to user device 110. The validation error may comprise details of the section of the specification file that failed validation, a validation error message (e.g., corresponding to the pre-configured rule), and/or the like. In response to the specification file passing validation, user device 110 inputs a service specific parameter (step 312). For example, the service specific parameter may comprise an integration service name, an integration service version, an integration service port, a preexisting integration service, and/or the like. Each input may be assigned an XML tag by service configuration framework 120 based on the input into configuration UI 125 (e.g., GUI fields enabling user input are associated with an XML tag).

In various embodiments, service configuration framework 120, via parsing deconstruction engine 223, parses and deconstructs the inputs (step 314). Parsing and deconstruction engine 223 may parse and deconstruct the specification file and the service specific parameters to determine one or more operations details specified therein. For example, parsing and deconstruction engine 223 may parse the specification file and the service specific parameters by identifying one or more XML tags and the corresponding text.

In response to parsing and deconstructing the inputs, service configuration framework 120, via data extraction engine 225, extracts the operation details from the parsed and deconstructed inputs (step 316). For example, data extraction engine 225 may extract the XML tag and corresponding text (e.g., the operation details) for each located XML tag. Service configuration framework 120, via input amalgamation engine 227, inputs the operation details into the selected integration pattern template (step 318). For example, input amalgamation engine 227 may parse the selected integration pattern template to determine the XML tag associated with each input field. Input amalgamation engine 227 may determine the operation detail having an XML tag matching the XML tag of the input field. In response to locating a match, input amalgamation engine 227 may edit the input field of the integration pattern template to comprise the operation detail. Input amalgamation engine 227 may continue inputting the operation details into the integration pattern template until all input fields of the integration pattern template are filled. In various embodiments, in response to the specification file not specifying a required operation detail or specifying an incompatible operation detail, service configuration framework 120 may fail or abort the service configuration file generation process, and provide an error message corresponding to the failure (e.g., the missing operation detail or the incompatible operation detail causing the failure).

In various embodiments, service configuration framework 120, via code generation engine 229, generates the service configuration file 140 (step 320). Code generation engine 229 may generate the service configuration file 140 based on the integration pattern template with the inputted operation details. For example, code generation engine 229 may generate the service configuration file 140 to comprise integration service specific code capable of being deployed in service integration platform 105. The service configuration file 140 may comprise a XML format. Service configuration framework 120 transmits the service configuration file 140 to service integration platform 105 (step 322). In response to receiving the service configuration file 140, service integration platform 105 may internally deploy and execute the service configuration file 140 to make the integration service available to data consumers 101. In that regard, data consumers 101, and/or service integration platform 105, may invoke the integration service to enable communications between one or more data consumers 101 and one or more data environments 103.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. Furthermore, any reference to singular includes plural embodiments, and any reference to more than one component may include a singular embodiment. Although specific advantages have been enumerated herein, various embodiments may include some, none, or all of the enumerated advantages.

Systems, methods, and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with", or similar phrases may include an identical match, a partial match, meeting certain criteria, matching a subset of data, a correlation, satisfying certain criteria, a correspondence, an association, an algorithmic relationship, and/or the like. Similarly, as used herein, "authenticate" or similar terms may include an exact authentication, a partial authentication, authenticating a subset of data, a correspondence, satisfying certain criteria, an association, an algorithmic relationship, and/or the like.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount, etc.) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post, social network input, and/or any other method known in the art.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system.

As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system, or any part(s) or function(s) thereof, may be implemented using hardware, software, or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by artificial intelligence (AI) or machine learning. Artificial intelligence may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

The computer system may also include a communications interface. A communications interface allows software and data to be transferred between the computer system and external devices. Examples of communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

Any communication, transmission, communications channel, channel, and/or the like discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word™ or EXCEL®, an ADOBE® Portable Document Format (PDF) document, etc.), an "ebook," an "emagazine," an application or microapplication (as described herein), an SMS or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Further, illustrations of the process flows and the descriptions thereof may make reference to user WINDOWS® applications, webpages, websites, web forms, prompts, etc. Practitioners will appreciate that the illustrated steps described herein may comprise in any number of configurations including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, components, modules, and/or engines of system 100 may be implemented as microapplications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

In various embodiments, the system may implement middleware to provide software applications and services, and/or to bridge software components in the computer based system, such as the operating system, database, applications, and the like. Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

The systems, computers, computer based systems, and the like disclosed herein may provide a suitable website or other internet-based graphical user interface which is accessible by users. Practitioners will appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. As a further example, representational state transfer (REST), or RESTful, web services may provide one way of enabling interoperability between applications.

In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the server may include application servers (e.g. WEBSPHERE®, WEBLOGIC®, JBOSS®, POSTGRES PLUS ADVANCED SERVER®, etc.). In various embodiments, the server may include web servers (e.g. Apache, IIS, GOOGLE® Web Server, SUN JAVA® System Web Server, JAVA® Virtual Machine running on LINUX® or WINDOWS® operating systems).

Users, systems, computer based systems or the like may communicate with the server via a web client. The web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE® CHROME® software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially-available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MYSQL® by MySQL AB (Uppsala, Sweden), MONGODB®, Redis, Apache Cassandra®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, U.S. application Ser. No. 15/943,271 titled FRAUD MANAGEMENT USING A DISTRIBUTED DATABASE and filed on Apr. 2, 2018, U.S. application Ser. No. 16/012,598 titled BUYER-CENTRIC MARKETPLACE USING BLOCKCHAIN and filed on Jun. 19, 2018, U.S. application Ser. No. 16/051,126 titled System and Method for Transaction Account Based Micro-Payments and filed on Jul. 31, 2018, and U.S. application Ser. No. 16/052,416 titled Procurement system using blockchain and filed on Aug. 1, 2018, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database, system, device, server, and/or other component includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic-curve cryptography (e.g., ECC, ECDH, ECDSA, etc.), and/or other post-quantum cryptography algorithms under development.

A firewall may include any hardware and/or software suitably configured to protect CMS components and/or enterprise computing resources from users of other networks. Further, the firewall may be configured to limit or restrict access to various systems and components behind the firewall for web clients connecting through a web server. The firewall may reside in varying configurations including Stateful Inspection, Proxy based, access control lists, and Packet Filtering among others. The firewall may be integrated within a web server or any other CMS components or may further reside as a separate entity. The firewall may implement network address translation ("NAT") and/or network address port translation ("NAPT"). The firewall may accommodate various tunneling protocols to facilitate secure communications, such as those used in virtual private networking. The firewall may implement a demilitarized zone ("DMZ") to facilitate communications with a public network such as the internet. The firewall may be integrated as software within an internet server, any other application server components or may reside within another computing device or may take the form of a standalone hardware component.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like. Cryptography and network security methods are well known in the art, and are covered in many standard texts.

In various embodiments, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multi-threaded Machine ("PM2"); a resource and performance monitoring tool, such as, for example, Node Application Metrics ("appmetrics"); a library module for building user interfaces, and/or any other suitable and/or desired module.

As will be appreciated by one of ordinary skill in the art, the system may be embodied as a customization of an existing system, an add-on product, a processing apparatus executing upgraded software, a stand-alone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software, and hardware. Furthermore, the system may take the form of a computer program product on a computer-readable storage medium having computer-readable program code means embodied in the storage medium. Any suitable computer-readable storage medium may be utilized, including hard disks, CD-ROM, SONY BLU-RAY DISC®, optical storage devices, magnetic storage devices, and/or the like.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, mechanical, electrical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
   retrieving, by a processor, an integration pattern template comprising a reusable schema that defines an integration service that provides an application programming interface (API) for access to a backend web service or database;
   parsing, by the processor, a specification file and a service specific parameter to determine an operation detail;
   extracting, by the processor, the operation detail from the specification file and the service specific parameter; and
   generating, by the processor, a service configuration file by inputting the operation detail into the integration pattern template, wherein the service configuration file is configured to make the integration service available when executed by a service integration platform.

2. The method of claim 1, further comprising transmitting, by the processor, the service configuration file to the service integration platform.

3. The method of claim 1, wherein the operation detail comprises a first XML tag.

4. The method of claim 3, wherein the parsing the specification file comprises identifying the operation detail based on the first XML tag.

5. The method of claim 4, wherein the integration pattern template comprises an input field having a second XML tag.

6. The method of claim 5, further comprising matching, by the processor, the first XML tag of the operation detail with the second XML tag of the input field from the integration pattern template, wherein in response to determining a match the operation detail is input into the integration pattern template.

7. The method of claim 1, further comprising validating, by the processor, the specification file by comparing the specification file against a pre-configured rule.

8. A system comprising:
a processor; and
a tangible, non-transitory memory configured to communicate with the processor, the tangible, non-transitory memory having instructions stored thereon that, m response to execution by the processor, cause the processor to perform operations comprising:
retrieving, by the processor, an integration pattern template comprising a reusable schema that defines an integration service that provides an application programming interface (API) for access to a backend web service or database;
parsing, by the processor, a specification file and a service specific parameter to determine an operation detail;
extracting, by the processor, the operation detail from the specification file and the service specific parameter; and
generating, by the processor, a service configuration file by inputting the operation detail into the integration pattern template, wherein the service configuration file is configured to make the integration service available when executed by a service integration platform.

9. The system of claim 8, further comprising transmitting, by the processor, the service configuration file to the service integration platform.

10. The system of claim 8, wherein the operation detail comprises a first XML tag.

11. The system of claim 10, wherein the parsing the specification file comprises identifying the operation detail based on the first XML tag.

12. The system of claim 11, wherein the integration pattern template comprises an input field having a second XML tag.

13. The system of claim 12, further comprising matching, by the processor, the first XML tag of the operation detail with the second XML tag of the input field from the integration pattern template, wherein in response to determining a match the operation detail is input into the integration pattern template.

14. The system of claim 8, further comprising validating, by the processor, the specification file by comparing the specification file against a pre-configured rule.

15. An article of manufacture including a non-transitory, tangible computer readable storage medium having instructions stored thereon that, in response to execution by a computer based system, cause the computer based system to perform operations comprising:
retrieving, by the computer based system, an integration pattern template comprising a reusable schema that defines an integration service that provides an application programming interface (API) for access to a backend web service or database;
parsing, by the computer based system, a specification file and a service specific parameter to determine an operation detail;
extracting, by the computer based system, the operation detail from the specification file and the service specific parameter; and
generating, by the computer based system, a service configuration file by inputting the operation detail into the integration pattern template, wherein the service configuration file is configured to make the integration service available when executed by a service integration platform.

16. The article of manufacture of claim 15, further comprising transmitting, by the computer based system, the service configuration file to the service integration platform.

17. The article of manufacture of claim 15, wherein the operation detail comprises a first XML tag.

18. The article of manufacture of claim 17, wherein the parsing the specification file comprises identifying the operation detail based on the first XML tag.

19. The article of manufacture of claim 17, wherein the integration pattern template comprises an input field having a second XML tag, and the operations further comprise matching, by the computer based system, the first XML tag of the operation detail with the second XML tag of the input field from the integration pattern template, wherein in response to determining a match the operation detail is input into the integration pattern template.

20. The article of manufacture of claim 15, further comprising validating, by the computer based system, the specification file by comparing the specification file against a pre configured rule.

* * * * *